United States Patent [19]

Ruoff, Jr.

[11] Patent Number: 4,513,317
[45] Date of Patent: Apr. 23, 1985

[54] RETINALLY STABILIZED DIFFERENTIAL RESOLUTION TELEVISION DISPLAY

[75] Inventor: Carl F. Ruoff, Jr., La Crescenta, Calif.

[73] Assignee: The United States of America as represented by the Administrator of the National Aeronautics and Space Administration, Washington, D.C.

[21] Appl. No.: 425,204

[22] Filed: Sep. 28, 1982

[51] Int. Cl.$^3$ .............................................. H04N 7/18
[52] U.S. Cl. .................................... 358/133; 358/109
[58] Field of Search ................. 358/109, 133, 93, 108, 358/137, 138, 166, 180

[56] References Cited

U.S. PATENT DOCUMENTS

| | | | |
|---|---|---|---|
| 3,507,988 | 9/1966 | Holmes | 358/133 |
| 4,028,725 | 6/1977 | Lewis | 358/109 |
| 4,349,815 | 9/1982 | Spooner | 340/705 |
| 4,405,943 | 9/1983 | Kanaly | 358/133 |

OTHER PUBLICATIONS

Fisher, Ralph W., "Remote Viewing System," published in *Remotely Manned Systems—Exploration and Operation in Space,* California Institute of Technology, 1973, pp. 229–238.
Merchang, John, "The Oculometer in Remote Viewing Systems," published in *Remotely Manned Systems—Exploration and Operation in Space,* California Institute of Technology, 1973, pp. 239–250.
Lo F. Christy, "Purkinje Image Eyetracker" SRI International, Mar. 1979.

*Primary Examiner*—Michael A. Masinick
*Assistant Examiner*—Edward L. Coles
*Attorney, Agent, or Firm*—Paul F. McCaul; John R. Manning; Thomas H. Jones

[57] ABSTRACT

A remote television viewing system employing an eye tracker is disclosed, wherein a small region of the image appears in high resolution, and the remainder of the image appears in low resolution. The eye tracker monitors the position of the viewer's line of sight. The eye tracker position data is transmitted to the remote television camera and control. Both the remote camera and television display are adapted to have selectable high-resolution and low-resolution raster scan modes. The position data from the eye tracker is used to determine the point at which the high-resolution scan is to commence. The video data defining the observed image is encoded in a novel format, wherein in each data field, the data representing the position of the high-resolution region of predetermined size appears first, followed by the high-resolution zone video data and then the low-resolution region data. As the viewer's line of sight relative to the displayed image changes, the position of the high-resolution region changes to track the viewer's line of sight.

12 Claims, 6 Drawing Figures

RETINALLY STABILIZED DIFFERENTIAL RESOLUTION TELEVISION DISPLAY

BACKGROUND OF THE INVENTION

1. Origin of the Invention

The invention described herein was made in the performance of work under a NASA Contract and is subject to the provisions of Section 305 of the National Aeronautics and Space Act of 1958, Public Law 85-568 (72 STAT 435; 43 USC 2457).

2. Field of the Invention

The field of the present invention is video display apparatus, and more particularly video display apparatus wherein a portion of an image is transmitted at a high-resolution level and the remainder of the image is transmitted at a lower resolution level.

3. Description of the Prior Art

Transmission of television signals wherein the entire image is scanned at high resolution requires a large bandwidth. This causes a severe problem in cases where the system must operate in environments in which bandwidth conservation is important, such as remote viewing systems in space applications.

Display systems have been employed which present a small centered area of high resolution, surrounded by a larger area of low resolution. These systems take advantage of the characteristics of the human eye, i.e., having a central high-resolution area, surrounded by a low-resolution periphery. While this has the desired effect of reducing the bandwidth, it does present a problem when the eye moves from the center of the screen. No matter how well the high-resolution zone may be matched to the viewer's gaze centered on the monitor screen, the inevitable movements of the eye will cause a high degree of annoyance; the screen will appear to be a misty window with a small spot wiped clear in the center.

This problem is alleviated to some extent by the system described in U.S. Pat. No. 3,507,988, issued to W. S. Holmes. Holmes discloses a narrowband television apparatus for displaying a high resolution region in the center area of the viewer's field of vision. The system includes electromechanical tracking of eye movement that utilizes a noncorrecting contact lens in conjunction with a position indicating light beam. The position coordinates defined by tracking eye movement are utilized to define the center of a constant speed spiral scan display. The Holmes system suffers several disadvantages, one being the discomfort of the observer due to the requisite noncorrecting contact lens supported on the eye and having an extension with light source 48. The patent teaches the use of a constant speed spiral beam scanning technique wherein resolution diminishes with distance from the center of the spiral, and hence is nonuniform in the area defined for high resolution.

The paper "Remote Viewing System" by Ralph W. Fisher, McDonnell Douglas Corporation, St. Louis, Mo., published in "Remotely Manned Systems—Exploration and Operation in Space," Proceedings of the First National Conference, Sept. 13-15, 1972, California Institute of Technology, Pasadena, Calif., edited by Ewald Heer, discusses a concept for a remote viewing system. The concept involves using an occulometer to track the observer's line of sight on a display to generate servo signals for aiming the remote camera.

The paper "The Occulometer in Remote Viewing Systems," by John Merchant, Honeywell Radiation Center, Lexington, Mass., also published in the above-referenced "Remotely Manned Systems—Exploration and Operation in Space," describes an eye position tracker used in an eye controlled variable resolution television.

Insofar as is known, however, no practical variable resolution remote viewing system is available today which includes a comfortable eye tracker, and a variable resolution, raster-scanned, television display and camera, wherein the position of the high-resolution region of the display is matched to the viewer's eye movements by variation of the location of the high-resolution scanning at the camera.

SUMMARY OF THE INVENTION

The present invention comprises the combination of eye tracking apparatus using reflected infrared light beams with raster scanned television apparatus, resolution switchable with coarse/fine electron beam and sampling modes. The eye tracker generates signals indicative of the position of the observer's line of sight. A camera controller, acting in response to the tracker signals, instructs the video camera to perform high-resolution sampling in a predetermined area adjacent to the image point at which the observer's line of sight is directed. The controller instructs the camera to sample at a low resolution rate the remainder of the image.

The apparatus further comprises encoding means for encoding the eye tracker position data and video data for transmission over a band-limited channel. A preferred encoding scheme for a field of a frame comprises first the specification of the coordinate data defining the high-resolution zone, followed by the high-resolution and low-resolution video data. At the receiver, the high-resolution portion of the field is reconstructed first, followed by the low-resolution portion.

Other features and improvements are disclosed.

DETAILED DESCRIPTION OF THE INVENTION

The present invention comprises a novel retinally stabilized variable resolution television display. The following description of the invention is provided to enable any person skilled in the art to make and use the invention, and sets forth the best mode contemplated by the inventor of carrying out his invention. Various modifications to the preferred embodiment will be readily apparent to those skilled in the art, and the generic principles defined herein may be applied to other embodiments. Thus, the present invention is not intended to be limited to the embodiment shown but is to be accorded the widest scope consistent with the principles and novel features disclosed herein.

Figure 1:
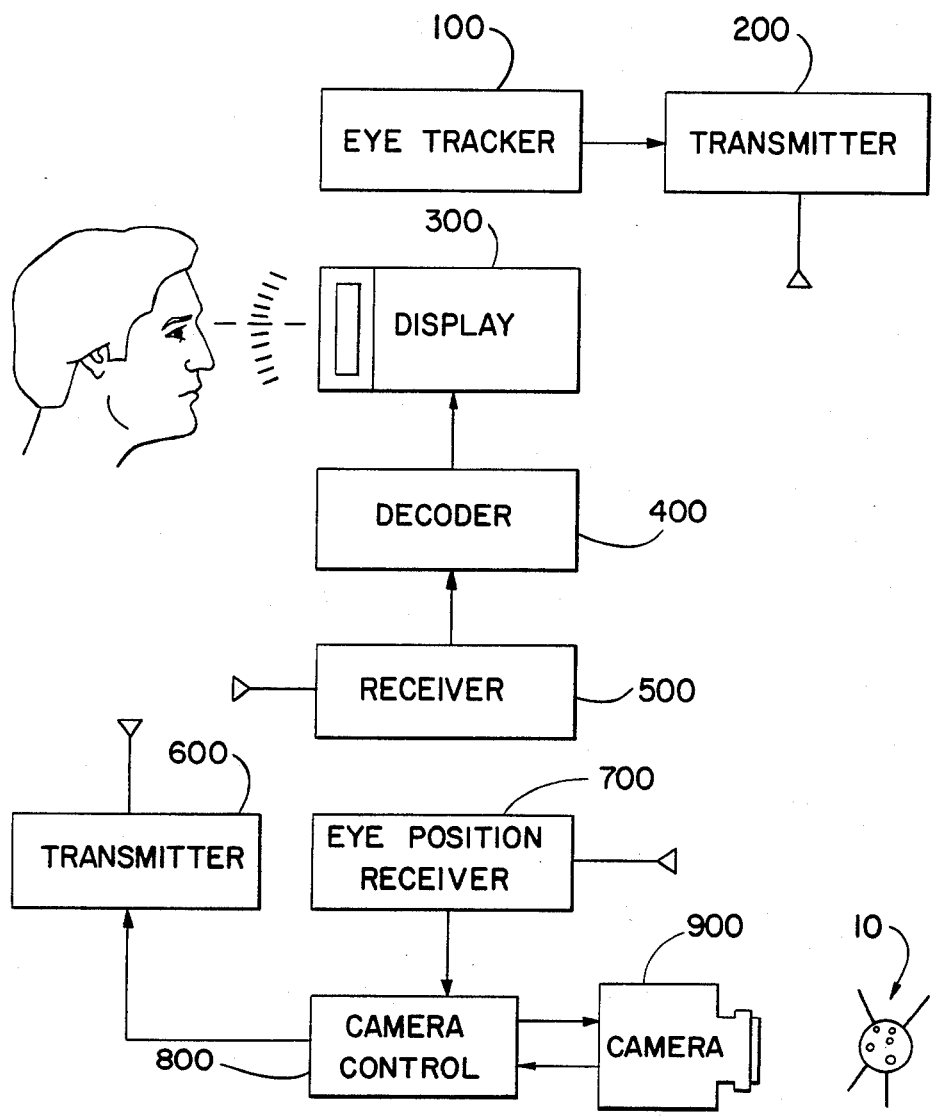
FIG. 1 is a system block diagram of the preferred embodiment.

A block diagram of the preferred embodiment is illustrated in FIG. 1. The viewer observes display 300, a raster-scanned cathode ray tube display. Display 300 displays images of scene 10 within the field of view of video camera 900. Eye tracker 100 senses the position of the viewer's line of sight and is coupled to transmitter 200 for transmitting the eye tracker position signals to the eye position receiver 700. The position signals from the eye position receiver 700 are coupled to camera control 800. Camera 900 is adapted to have selectable high-resolution and low-resolution resolving of the perceived image of scene 10, and is controlled by camera control 800. Camera control 800 provides the video data representing the raster-scanned image of scene 10 to transmitter 600 for transmission to receiver 500 and processing by decoder 400 to be represented in the display 300.

The purpose of the present invention is to provide a remote television apparatus which utilizes the variable resolution properties of the human eye to reduce the bandwidth requirements of the system. Thus, only a portion of the image subtended by the gaze of the viewer's eye is of high resolution; the remainder is of low resolution. Eye tracker 100 tracks the movement of the viewer's line of sight and generates a signal indicative of the position of the line of sight relative to the display screen 300. The eye tracker information is transmitted to the video camera control 800 which controls the video camera 900 and the position of the high-resolution zone relative to the image viewed by camera 900.

Eye trackers are well known in the art, such as, for example, the occulometer developed by the Honeywell Radiation Center, Lexington, Mass. and discussed in the above-referenced paper entitled "The Occulometer in Remote Viewing Systems." This occulometer uses infrared radiation to illuminate the eye, and provides digital signals representative of the X and Y coordinates of the pupil and of the corneal reflection of the eye. Since this type of eye tracking apparatus is well known in the art, and the details of construction per se form no part of the present invention, it will not be described in any further detail herein.

Figure 2:
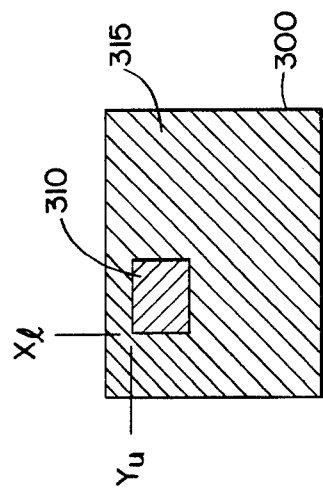
FIG. 2 is an illustration of the video display of the preferred embodiment, showing the low- and high-resolution zones.

Referring now to FIG. 2, an illustration of the video display showing the high-resolution zone is depicted. High-resolution zone 310 is disposed within the larger low-resolution zone 315 of the display screen of display 300.

Figure 3:
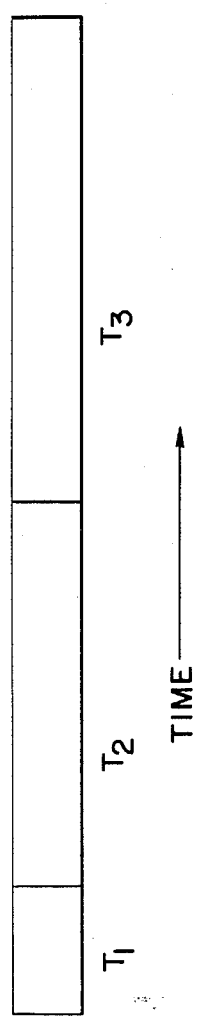
FIG. 3 is an illustration of the data encoding scheme for a single field of data.

One facet of the present invention is the format of the video data and the data defining the position of the high-resolution region. As is well known, the conventional television images transmission data comprises odd and even raster fields which are interlaced to form a single frame of the image. Typically, at least thirty frames are transmitted and displayed each second to eliminate any flicker to the observer. In the preferred embodiment, each field of a frame is defined by data transmitted in accordance with the general format shown in FIG. 3. The encoding scheme specifies data defining the coordinates ($X_L$, $Y_U$) of the upper left-hand corner of the high-resolution zone, followed by first the high-resolution and then the low-resolution video data. The decoding operation ensures that the high-resolution portion of the image is then reconstructed first, followed by the low-resolution portion.

The size of the high-resolution zone is predetermined by convention, in the preferred embodiment, so that the size of the zone need not be transmitted and thereby consume additional bandwidth. Thus, in the general coding illustration of FIG. 3, in time interval $T_1$, the coordinate data defining the position of the high-resolution zone is provided. In time interval $T_2$, data is provided which defines the high-resolution video image portion. In time interval $T_3$, data is provided for defining the low-resolution portion of the image.

Camera 900 and display 300 must both have high-resolution and low-resolution modes, wherein the electron guns can be commanded to produce a high-resolution (fine) electron beam or a low-resolution (coarse) beam. The beam scanning of the display is synchronized to that of the camera.

The location of the high-resolution region is represented by a first voltage value which represents the fraction of full scale horizontal beam deflection at which the left-most edge of the high-resolution region begins, and a second voltage value which represents the fraction of full vertical deflection at which the uppermost edge of the high-resolution region begins. These voltage values lie between the blanking voltage and the maximum voltage values. The location data is supplied for both the odd and even fields.

Since the first two lines of each field are used to encode the high-resolution region location, a departure from current television convention, these values must be blanked internally so that the values are not displayed. This is accomplished by the field region detector shown in FIG. 6.

Figure 4:
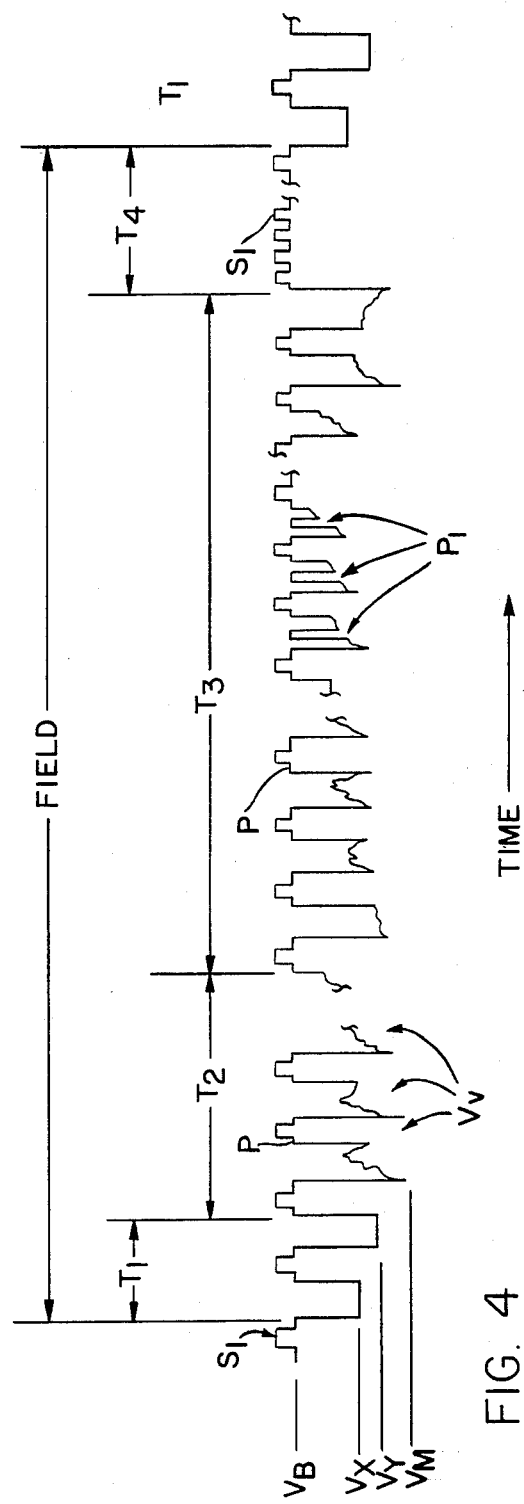
FIG. 4 is a graph illustrating the composite video information signal as a function of time.

All other raster lines are encoded in the conventional manner with blanking, sync pulses and video (see FIG. 4). A certain number of lines from each field (the same for each) is allocated to the high-resolution region. The remaining lines of each field are allocated to the low-resolution region definition and the vertical and equalization pulses.

Referring now to FIG. 4, a typical waveform of one field of the video signal from camera control 800 is illustrated. Time intervals $T_1$, $T_2$ and $T_3$ correspond to like intervals of FIG. 3. Thus, in interval $T_1$, the signal contains information specifying the location of the high-resolution zone in relation to the image being transmitted. Voltage levels $V_B$ and $V_M$ comprise the levels corresponding to "black" and maximum "white" of the CRT electron beam intensity. Voltage levels $V_X$ and $V_Y$ are the voltage levels defining the relative position of the upper left-hand corner of the high-resolution zone. This data is detected by the high-resolution zone location detector 405 of the video receiver shown in FIG. 6, and is used to bias the deflection yokes of the display CRT so that the electron beam is correctly positioned to commence raster display of the high-resolution zone.

In interval $T_2$, the video signal defines the high-resolution portion of the image. The use of blanking pedestals to blank the raster beam during beam retrace is understood to be conventional practice in the television art. Conventional blanking pedestals P blank the raster beam during retrace of the beam from completion of a line to the beginning of the next line. Time varying $V_V$ signals comprise the video information signal for individual lines.

In time interval $T_3$, the video signal defines the low-resolution portion of the image. Additional blanking pedestals $P_1$ blank the video beam where the low-resolution portion of the field overlaps the high-resolution portion of the field.

Time interval $T_4$ separates successive data fields and is utilized for synchronization, equalization, vertical blanking and synchronization information, as is conventionally done.

The temporal scanning rate is the same for all lines, both high- and low-resolution. High spatial resolution in the high-resolution region results from the fact that because the region size is smaller, the linear scanning velocity is correspondingly lower. This allows the finer electron beam to sample finer spatial detail without exceeding the transmission bandwidth. Conversely, the low-resolution region is larger, and because the scan interval is the same for all lines, it has a correspondingly higher linear scanning velocity (and a coarser beam) resulting in lower spatial resolution. The coarse scanning electron beam is blanked when the scan spot is in the high-resolution region to avoid double display and premature pixel discharge. Each pixel is scanned every 1/30 second.

During each field, the high-resolution region is displayed by (a) switching the gain of the horizontal and vertical amplifiers to correspond to the appropriate full scale width and height of the region (these values are predetermined by convention), (b) adding appropriate bias voltages corresponding to the region location to the display yoke to provide the appropriate region position displacement to the electron beam, and (c) switching the electron gun from coarse to fine beam. The high-resolution region therefore consists of a portion of the overall image.

The low-resolution region of the image is displayed by (a) switching the deflection amplifier gain so that full scale deflections correspond to the normal screen height and width, (b) removing the displacement bias, and (c) switching the electron gun to coarse mode. As mentioned above, when in the coarse scan mode, the electron beam is blanked when the raster beam lies in the high-resolution region. The low-resolution portion of the image therefore consists of a full screen coarse video picture or image with a blank region corresponding to the high-resolution region.

Alternatively, the invention could be used for solid state cameras if the cameras have sufficient resolution. Readout in fine mode would be the normal mode, while reading in the coarse mode would use pixel averaging (this would be the same as having a coarse electron beam).

Figure 5:
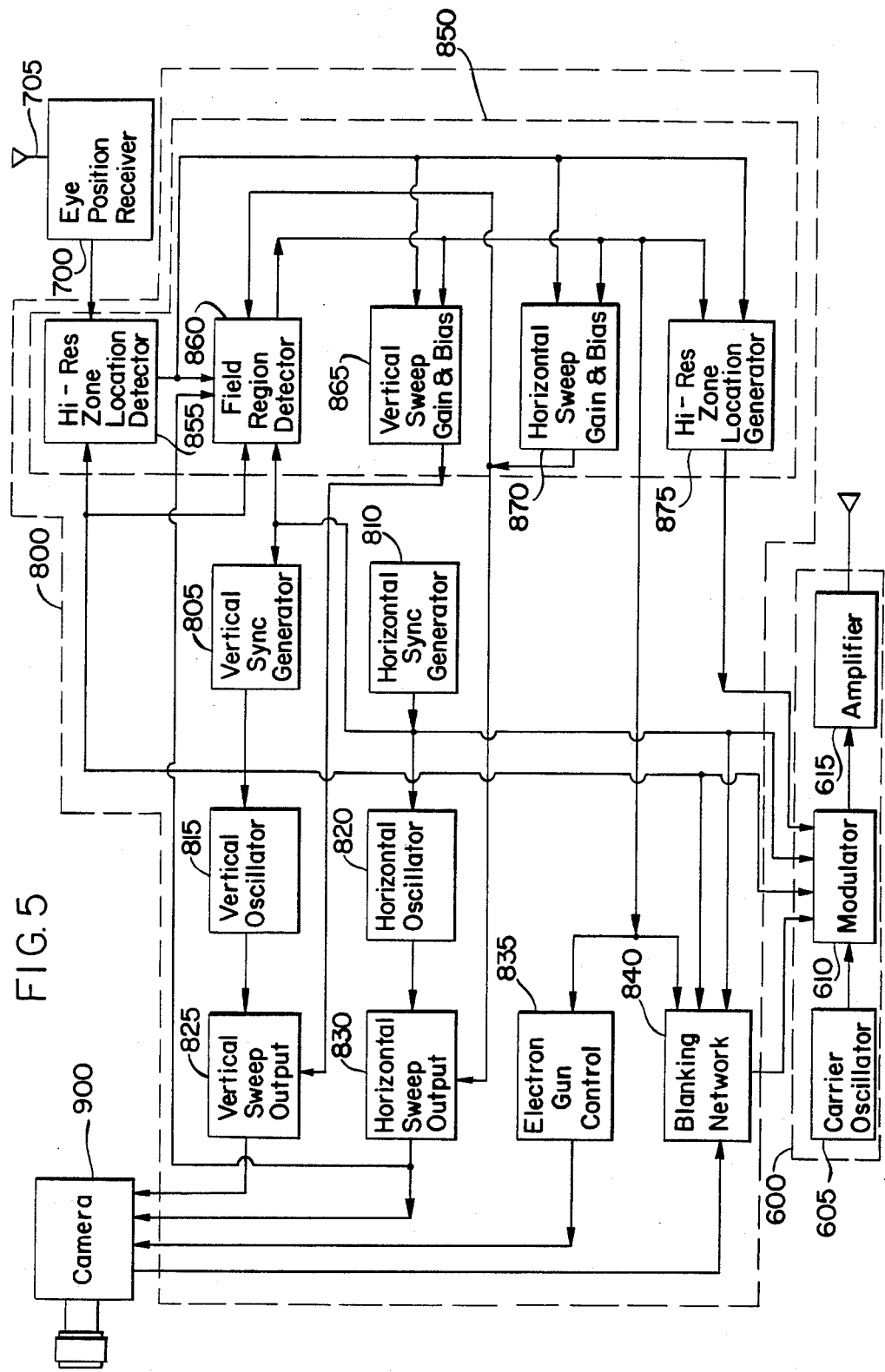
FIG. 5 is a schematic block diagram of the transmitter of the preferred embodiment.
Figure 6:
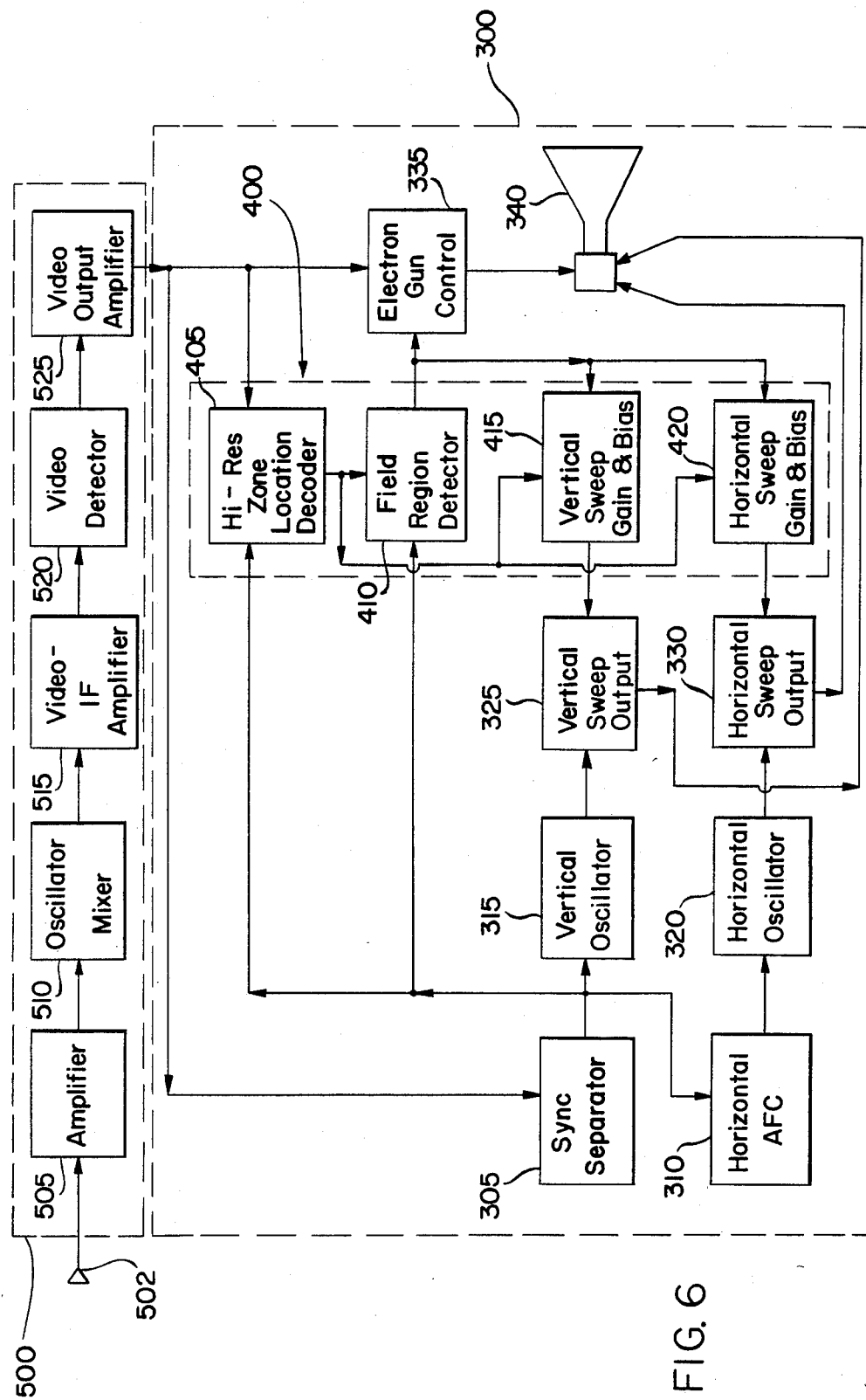
FIG. 6 is a schematic block diagram of the video receiver and display of the preferred embodiment.

The invention may be implemented by modifying existing television transmission and reception equipment. FIGS. 5 and 6 outline block diagrams of such modified equipment. Referring now to FIG. 5, eye position receiver 700 receives via transmission link 705 data representative of the point of the video display on which the operator's gaze is currently fixed, i.e., the operator's line of sight. This data is time varying, depending upon the operator's line of sight, and is determined by eye tracker 100. The data is used to define coordinates $X_L$, $Y_U$. Conventional telemetry techniques may be utilized to transmit this information. Since such techniques are well known in the remote sensing art, and the details thereof do not per se form a part of the present invention, such details will not be described further. The eye position receiver 700 is operative to receive such information representative of the observer's line of sight relative to the display screen.

The high-resolution zone location detector 855 decodes the $T_1$ interval data provided by the eye position receiver 700 at the appropriate time as indicated by the vertical synchronization pulse. The coordinate values are stored in a sample and hold network for bias calculation, and are also inserted in the video output and scan generation data signal for the current field. Thus, the output of detector 855 is coupled to field region detector 860 and to high-resolution zone location generator 875. The output is also coupled to the vertical and horizontal sweep gain and bias circuits 865 and 870.

Field region detector 860 monitors the raster line count and the scanning beam position relative to the high-resolution zone. From this calculation and information, detector 860 controls beam blanking during the first two lines of the field data, i.e., the high-resolution region location data, and also when the coarse beam is within the high-resolution region. The field region detector 860 also controls application of the appropriate biases and gains to the vertical and horizontal gain and bias circuits 865 and 870 in order to position and size the high-resolution region. The field region detector 860 further commands the switching of the electron gun resolution mode and controls the encoding of the high-resolution region position codes into the output video signal of the first two lines of each field.

The vertical sweep gain and bias circuit 865 uses the output of the high-resolution zone location detector 855 to determine the appropriate vertical bias for positioning the high-resolution zone. The bias for the low-resolution zone is fixed by convention, as are the gains for the high- and low-resolution sweeps.

The horizontal sweep gain and bias circuit 870 uses the output of the high-resolution zone location detector 855 to determine the correct horizontal bias for positioning the high-resolution zone. The low-resolution bias is fixed by convention, as are the gains for both the high- and low-resolution sweeps.

The high-resolution zone location generator 875 formats the current high-resolution zone location data, encoding the data under command of the field region detector 860, into the first two lines of the output video data to be transmitted by transmitter 600.

The remaining elements of camera control 800 are conventional television circuits. Thus, vertical and horizontal sync generators 805 and 810, vertical and horizontal oscillators 815 and 820, vertical and horizontal sweep output circuits 825 and 830, electron gun control circuit 835 and blanking network 840 perform similar functions as conventional television counterpart circuitry elements. Since these elements are conventional, the details of their function and operation will not be described in any further detail.

Referring now to FIG. 6, the block diagram of the video receiver 500, decoder 400 and display 300 is shown. The video signal is received via transmission link 502 and processed by receiver 500. Thus, amplifier 505 of receiver 500 amplifies the received carrier modulated signal. The amplified signal is then mixed in oscillator/mixer 510, and the resultant signal passed through video IF amplifier 515. Video detector 520 recovers the raw video information from the IF signal and the detected signal is amplified by amplifier 500 to provide the video information signal, the output of receiver 500.

Display 300 comprises the elements enclosed within phantom line 300 in FIG. 6. The synch separator 305, horizontal AFC 310, vertical and horizontal oscillators 315 and 320, vertical and horizontal sweep outputs 325 and 330, electron gun control 335 and CRT 340 are all circuits and circuit elements conventionally found in television receivers.

Decoder 400 decodes the received signals to ascertain the location of the high-resolution zone of the image. The high-resolution zone location decoder 405 decodes the position of the high-resolution region from the first two lines of each data field. The output of decoder 405 is coupled to field region detector 410, and to the vertical and horizontal sweep gain and bias circuits 415 and 420.

The field region detector 410 monitors the line count in each frame, thereby keeping track of the current region being displayed. Detector 410 commands blanking of the electron beam (by input to electron gun control 335) during the first two lines to suppress display of the voltage values corresponding to the high-resolution zone position. Detector 410 also commands the correct (coarse or fine) electron beam mode corresponding to high- or low-resolution scanning, and governs the selection of the correct sweep gains and biases for displaying the high- and low-resolution regions.

It is understood that blanking the low-resolution scan when it coincides with the high-resolution region is bandwidth wasteful. Means for eliminating this waste involve data compression, which can be provided at the expense of greater circuitry complexity, both in transmission and reception. Since the waste of bandwidth occurs during the low-resolution scan and hence consists of a small number of lines, it is not clear that the more complex approach is warranted.

The vertical sweep gain and bias circuitry 415, as well as the horizontal sweep gain and bias circuitry 420 in the decoder have the same function as in the camera control 800.

The line of sight of the viewer's eye is therefore used to position the high-resolution zone on the CRT display. Instead of mechanically re-aiming the camera in response to variations in the viewer's line of sight, the preferred embodiment simply moves the region in which high-resolution scanning of the image is performed. This is believed to result in a substantial reduction in the complexity of the remote viewing system.

What is claimed is:

1. A differential resolution television apparatus for displaying images of a remote site comprising:
   a raster-scanned CRT display means having a viewing screen for displaying said images, said display means adapted for selectable raster scan operation at a first resolution level and at a second resolution level;
   eye tracking means for sensing the line of sight of an observer's eye relative to the viewing screen and generating first position signals indicative of the position of the observer's line of sight relative to the viewing screen;
   video camera means adapted for selectable raster scan sampling at said first resolution level and at said second resolution level such that a first region of the image is sampled at said first resolution level and the remainder of said image is sampled at said second resolution level;
   camera control means for controlling the resolution level of said camera means and the location of said first region in dependence upon said position signals from said eye tracking means;
   means for transmitting video data generated by said camera means to said CRT display means, said CRT display means being further adapted to display said image at said first resolution level within said first region and at said second resolution level for the remainder of said image; and wherein said first resolution level is obtained by selecting a fine CRT beam and using the same raster line scan interval to scan a line in said first region as to scan a line at said second resolution level.

2. The apparatus of claim 1 wherein said second resolution level is obtained by selecting a coarse CRT beam.

3. The apparatus of claim 1 wherein said third set of data includes data representative of the entire image at said second resolution level, and further includes blanking signals indicating blanking of said CRT beam when passing within said first region.

4. A differential resolution television apparatus for displaying images of a remote site comprising:
   a raster-scanned CRT display means having a viewing screen for displaying said images, said display means adapted for selectable raster scan operation at a first resolution level and at a second resolution level;
   eye tracking means for sensing the line of sight of an observer's eye relative to the viewing screen and generating first position signals indicative of the position of the observer's line of sight relative to the viewing screen;
   video camera means adapted for selectable raster scan sampling at said first resolution level and at said second resolution level such that a first region of the image of predetermined size is sampled at said first resolution level and the remainder of said image is sampled at said second resolution level;
   camera control means for controlling the resolution level of said camera means and the location of said first region in dependence upon said position signals from said eye tracking means, said camera control means including means for encoding video data generated by said camera means in a format wherein each field of a frame includes a first set of data representing the position of said first portion of said image, and second and third sets of data representative, respectively, of said first region of said image, and the remainder of said image, said first set of data including data representative of the position of the upper left-hand corner of said first region relative to said display; and
   means for transmitting video data generated by said camera means to said CRT display means, said CRT display means being further adapted to display said image at said first resolution level within said first region and at said second resolution level for the remainder of said image.

5. The apparatus of claim 4 wherein said display means further includes receiver means for receiving said transmitted data from said transmitting means.

6. The apparatus of claim 5 wherein said display means further comprises decoder means coupled to said receiver means and adapted to decode said first set of data to recover second position signals representing the position of said first region.

7. The apparatus of claim 6 further including field region detecting means for monitoring the raster line count in each field and determining the appropriate display resolution level from said second position signals and said line count.

8. A differential resolution television apparatus for displaying images of a remote site comprising:
   a raster-scanned CRT display means having a viewing screeen for displaying said images, said display means adapted for selectable raster scan operation at a first resolution level and at a second resolution level;

eye tracking means for sensing the line of sight of an observer's eye relative to the viewing screen and generating first position signals indicative of the position of the observer's line of sight relative to the viewing screen;

video camera means adapted for selectable raster scan sampling at said first resolution level and at said second resolution level such that a first region of the image is sampled at said first resolution level and the remainder of said image is sampled at said second resolution level;

camera control means for controlling the resolution level of said camera means and the location of said first region in dependence upon said position signals from said eye tracking means;

means for transmitting video data generated by said camera means to said CRT display means, said CRT display means being further adapted to display said image at said first resolution level within said first region and at said second resolution level for the remainder of said image;

eye position receiver means for receiving said first position signals;

first region detector means for decoding said first position signals, said means including storing means for storing said first position signals; and field region detector means adapted to monitor the raster scan line count of said camera means and the raster line position relative to said first region.

9. The apparatus of claim 8 wherein said field region detector means is adapted to generate a camera scan beam control signal, and said apparatus further includes electron gun control means for selection of the scan beam mode.

10. The apparatus of claim 9 wherein said camera control means further includes gain control means for controlling the vertical and horizontal sweep gains in dependence upon said beam control signal.

11. The apparatus of claim 10 wherein said gain control means is adapted to set a first predetermined gain for said first resolution level, and a second predetermined gain for said second resolution level.

12. The apparatus of claim 11 further comprising means for providing bias signals to said camera means in dependence upon said first position signals.

* * * * *